Aug. 11, 1970

M. D. BJORKE 3,524,148

DOUBLE PULSE MODULATOR

Filed Oct. 30, 1968

INVENTOR.
MERLIN D. BJORKE

BY Charles J. Ungemach

ATTORNEY

_United States Patent Office_

3,524,148
Patented Aug. 11, 1970

3,524,148
DOUBLE PULSE MODULATOR
Merlin D. Bjorke, Minneapolis, Minn., assignor to Honeywell Inc., Minneapolis, Minn., a corporation of Delaware
Filed Oct. 30, 1968, Ser. No. 771,820
Int. Cl. H03k 7/00, 17/20
U.S. Cl. 332—9
2 Claims

ABSTRACT OF THE DISCLOSURE

A double pulse modulator having a pair of pulse forming networks that are charged simultaneously in response to a single trigger pulse and discharge at different times to develop a double pulse.

BACKGROUND OF THE INVENTION

The invention is in the field of modulators and particularly pulse modulators incorporating a saturable transformer. The invention provides an accurate and fast double pulse modulator which is inexpensive to manufacture and compact. The invention can be used to provide simple and accurate pulse coding.

DESCRIPTION OF THE PREFERRED EMBODIMENT

Figure 1:
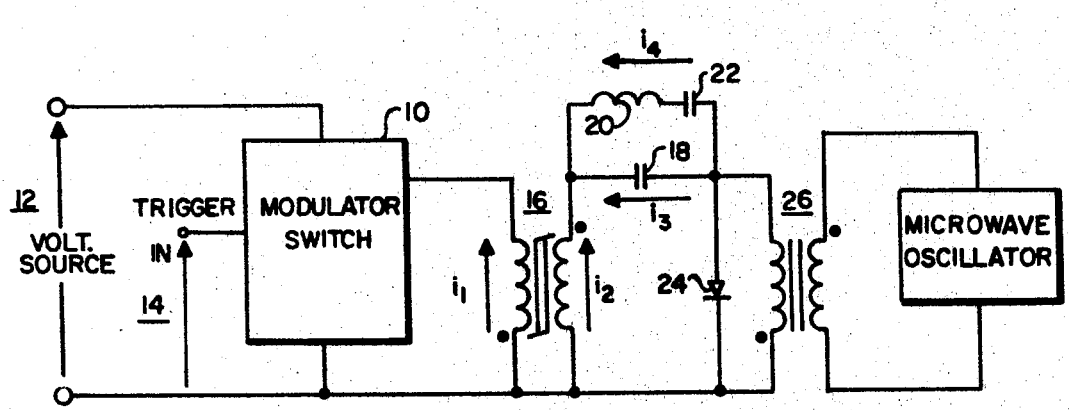
FIG. 1 is a schematic diagram of the double pulse modulator; and, FIGS. 2, 3, and 4 illustrate typical wave forms that are found at various points in the schematic diagram of FIG. 1.
Figure 2:

The modulator includes a switch 10 which is supplied with a DC voltage from a source 12 and energized by trigger pulses from a trigger source 14. When switch 10 is triggered, a single high energy pulse is applied to the primary winding of a saturable core transformer 16 causing current $i_1$ to flow upward in the primary winding. FIG. 2 shows the form of the voltage at the upper end of the primary winding. Current $i_1$ in the primary winding of transformer 16 causes a current $i_2$ to be induced in the secondary winding. Current $i_2$ flows upward as shown. Current $i_2$ divides and flows in two paths. The first path is through a series circuit comprising a capacitor 18 and a forward-biased diode 24. The second path is through an inductor 20, a series capacitor 22, and the forward biased-diode 24. Capacitor 18 forms a first pulse forming network and inductor 20 in combination with capacitor 22 forms a second pulse forming network. Current $i_2$ charges the first and second pulse forming networks very rapidly through diode 24. As the pulse applied to the primary winding of transformer 16 approaches its peak its rate of change begins to decrease and the voltage induced in the secondary winding of transformer 16 begins to decrease. Simultaneously with the decrease of the induced voltage across the secondary winding of transformer 16 the pulse forming networks begin to discharge. The discharge current together with the current $i_1$ remaining in the primary winding of transformer 16 causes transformer 16 to be driven into saturation. When transformer 16 is saturated its impedance is very low.

Figure 3:
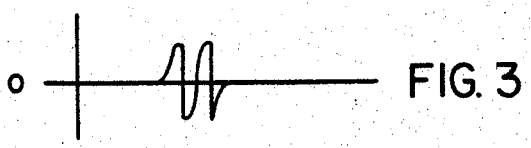

During the time transformer 16 is saturated the discharge current from the pulse forming networks is limited only by the very low series resistance of the secondary winding of transformer 16 and the primary winding of a second transformer 26. The primary winding of transformer 26 is connected across diode 24. Consequently because of the very low resistance in the discharge path for the pulse forming networks the discharge current increases very rapidly to a very high value. The wave form of the discharge current in the secondary winding of transformer is shown in FIG. 3. This high rate of change of current through the primary winding of transformer 26 induces a very sharp high voltage pulse output across the secondary winding of transformer 26. The pulses developed across the secondary winding of transformer 26 are applied, for example, to a microwave oscillator and modulate it.

Figure 4:
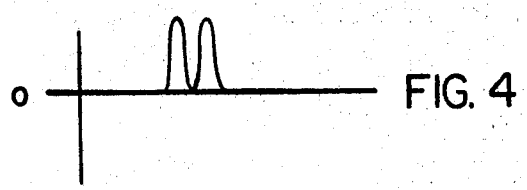

The generation of two pulses across the secondary winding of transformer 26 is accomplished through the use of the two separate pulse forming networks. The first pulse of a pulse pair is produced by the discharge of the pulse forming network formed by capacitor 18. The first pulse will begin at the instant transformer 16 first saturates and lasts as long as the discharge current from capacitor 18 can keep transformer 16 in saturation. The second pulse of the pulse pair is produced by the discharge of the pulse forming network made up of inductor 20 and capacitor 22. Inductor 20 and capacitor 22 along with the leakage and stray inductance and capacitance of the layout wiring, etc., and the transformer windings, approximates the elements of a lumped delay line. This lumped delay line is unterminated and a pulse reflected from the unterminated delay line forces transformer 16 into saturation again. Consequently another high current pulse is applied to the primary winding of transformer 26 and a pulse is induced in the secondary winding thereof. The form of the pulses at the secondary winding of transformer 26 is shown in FIG. 4. The time between the two output pulses is approximately $2(L_t C_t)^{\frac{1}{2}}$ seconds where $L_t$ is the total inductance of the delay line in henrys and $C_t$ is the total capacitance of the delay line in farads. This circuit allows accurate and fast double pulsing of a plate modulated microwave transmitter. Previous methods generally either required costly and bulky duplicate modulators or a change to grid modulation. Double pulsing as described above greatly increases the applications of plate modulated transmitters because they can be pulse coded economically.

What has been described is at present considered the preferred embodiment of the invention. It will be obvious to those skilled in this art that various changes and modifications can be made.

What is claimed is:
1. A double pulse electronic modulator comprising:
   means for generating a voltage trigger pulse;
   a first saturable transformer having primary and secondary windings, the trigger pulse being applied to the primary winding;
   first and second pulse forming networks, connected in parallel;
   a unidirectional current device, connected in series with the first and second pulse forming networks, the circuit comprising the pulse forming networks and the current device connected across the transformer secondary winding;

a second transformer having primary and secondary windings, the primary winding connected across the unidirectional current device, the secondary winding having output terminals for connection to apparatus to be modulated.

2. The apparatus of claim 1 wherein the first pulse forming network is a first capacitor, the second pulse forming network is a second capacitor and an inductor in series, and the unidirectional current device is a diode.

References Cited

UNITED STATES PATENTS

| | | | |
|---|---|---|---|
| 2,698,896 | 1/1955 | Rinia | 325—143 X |
| 2,859,408 | 11/1958 | Holzer. | |
| 2,452,547 | 11/1948 | Chatterjea et al. | 332—12 |

ALFRED L. BRODY, Primary Examiner

U.S. Cl. X.R.

307—246; 325—141; 328—67, 78; 332—12